May 8, 1962   F. O. UNDERWOOD   3,034,103
DATA COMPARING AND SORTING APPARATUS
Filed Aug. 6, 1958   7 Sheets-Sheet 1

INVENTOR
FRANCIS O. UNDERWOOD
BY Paul M. Brennan
AGENT

May 8, 1962  F. O. UNDERWOOD  3,034,103
DATA COMPARING AND SORTING APPARATUS
Filed Aug. 6, 1958  7 Sheets-Sheet 2
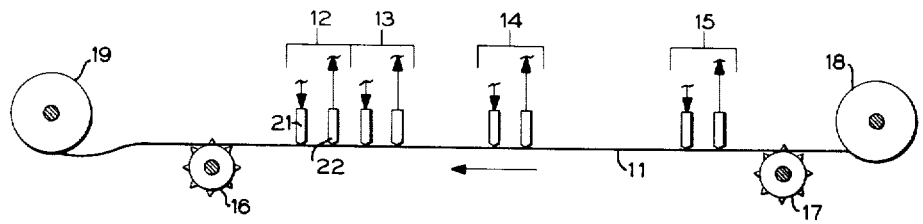
FIG_2
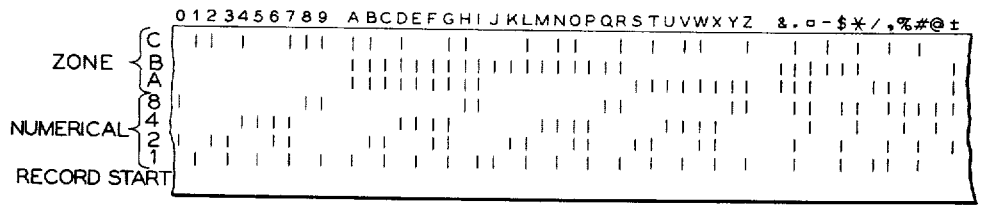
FIG_3
```
ABCDEFGHIJK         ABCDEFGHIJK
 ) )    )            )) )
 47152723698         241 25736798  ─────POSITION  1
 ⊢──┘                ⊢┘
 27154723698         14225736798   ─────    "    2
 ⊢──┘                ⊢┘
 27154723698         12245736798   ─────    "    3
   ⊢─┘                ⊢┘
 27154723698         12245736798   ─────    "    4
    ⊢┘                  ⊢┘
 27134725698         12234756798   ─────    "    5
    ⊢─┘                  ⊢─┘
 24136725798         12234657798   ─────    "    6
      ⊢┘                   ⊢┘
 24136725798         12234657798   ─────    "    7
       ⊢┘                   ⊢┘
 24136725798         12234567798   ─────    "    8
        ⊢┘                    ⊢┘
 24126735798         12234567798   ─────    "    9
         ⊢┘                    ⊢┘
 24125736798         12234567798   ─────    "   10
          ⊢┘                     ⊢┘
 24125736798         12234567789   ─────    "   11
           ⊢┘
                     12234567789   ─────    "   12
```
FIG_4

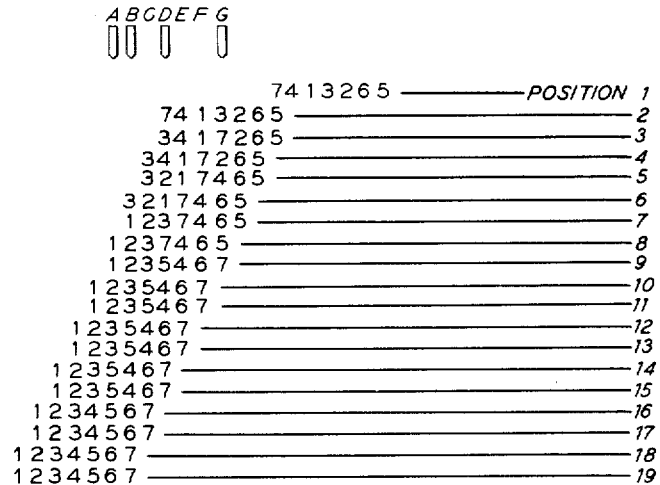
FIG_5
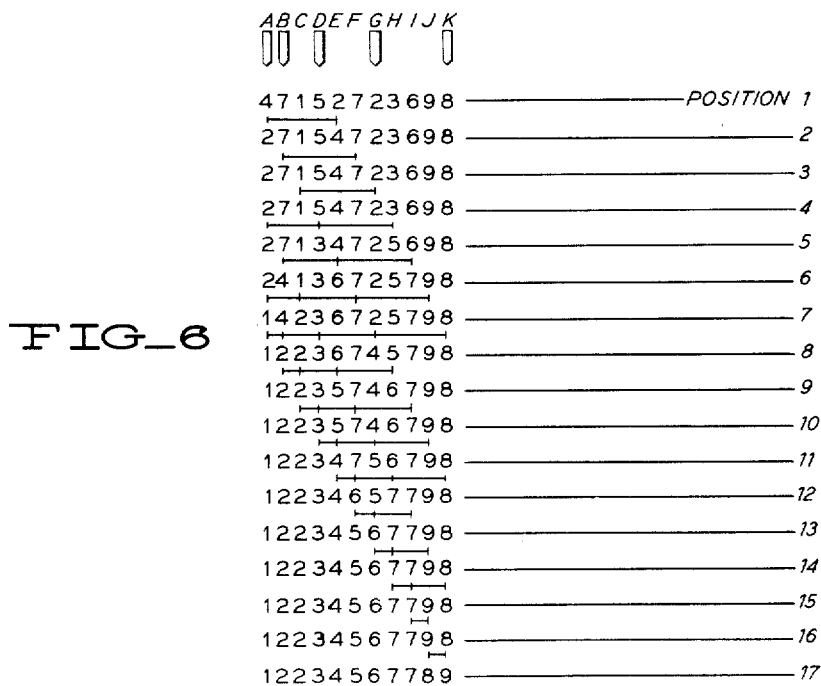
FIG_6

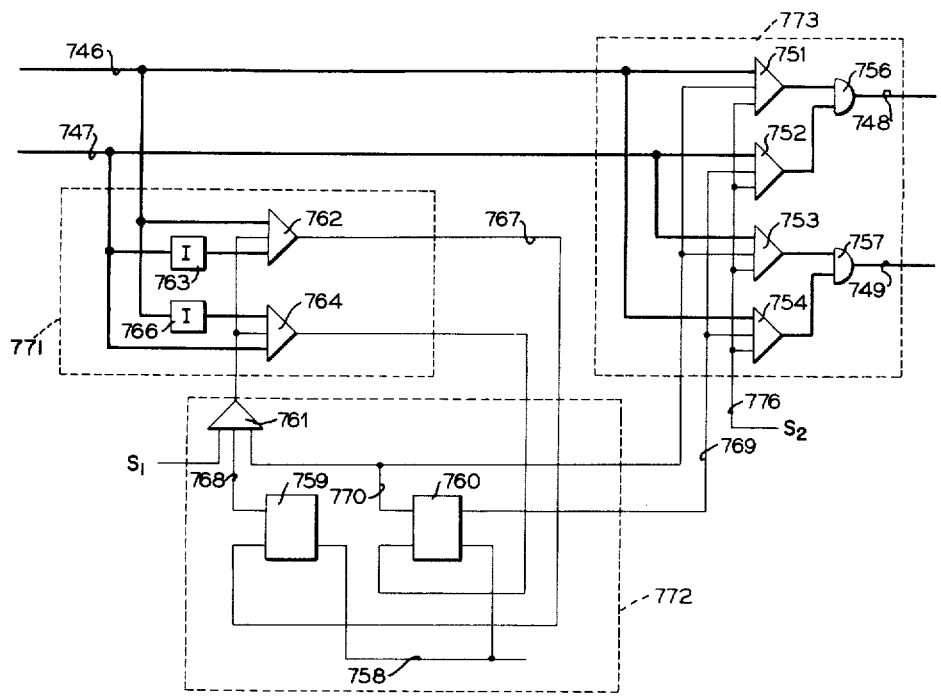
FIG_7
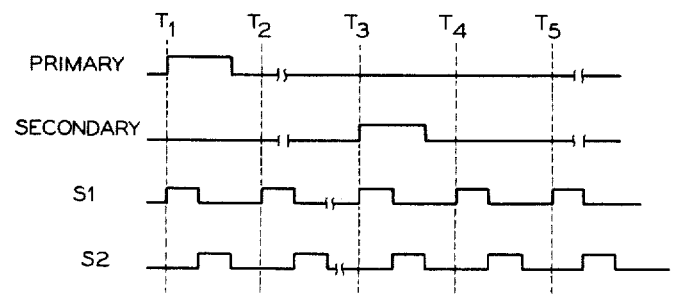
FIG_8

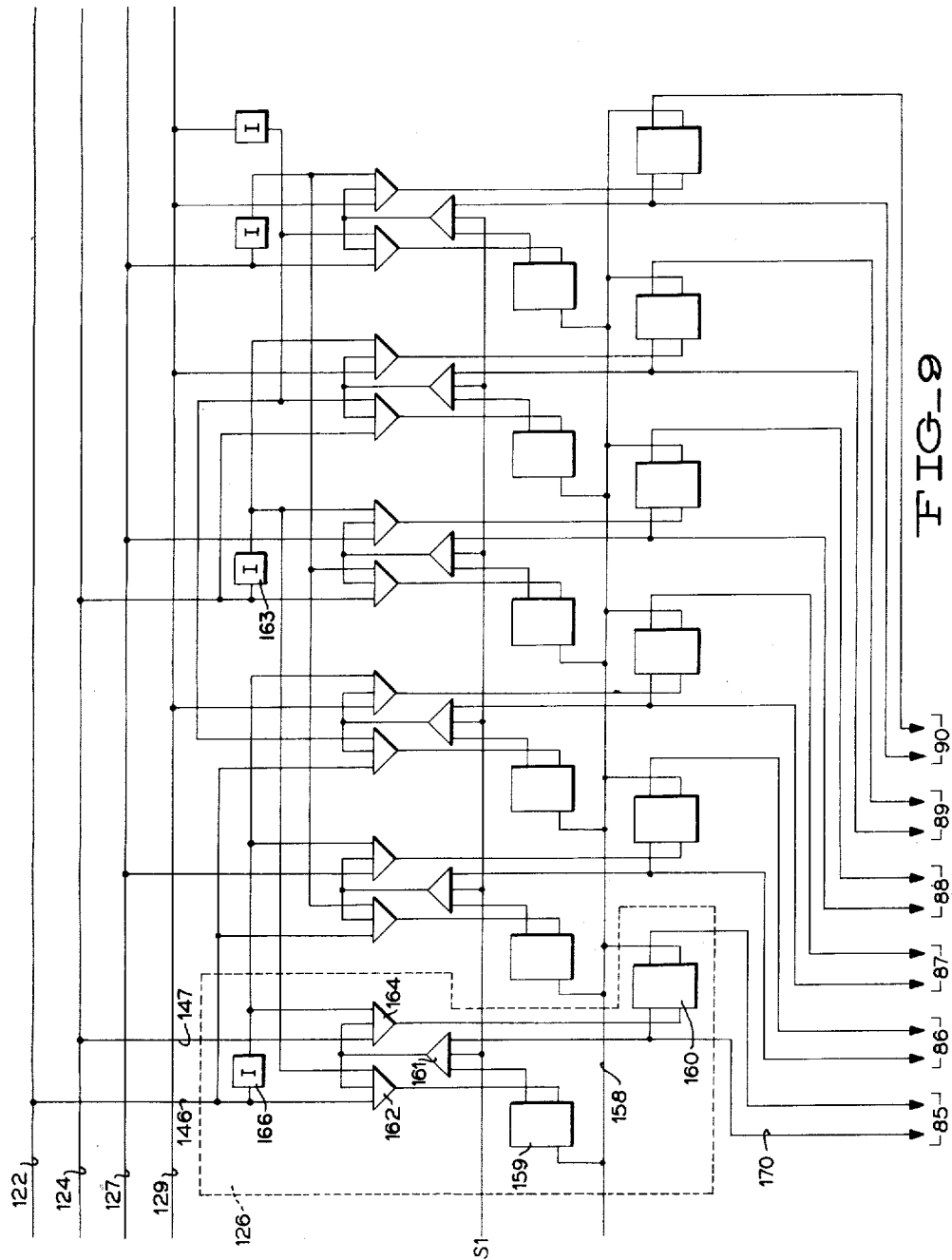

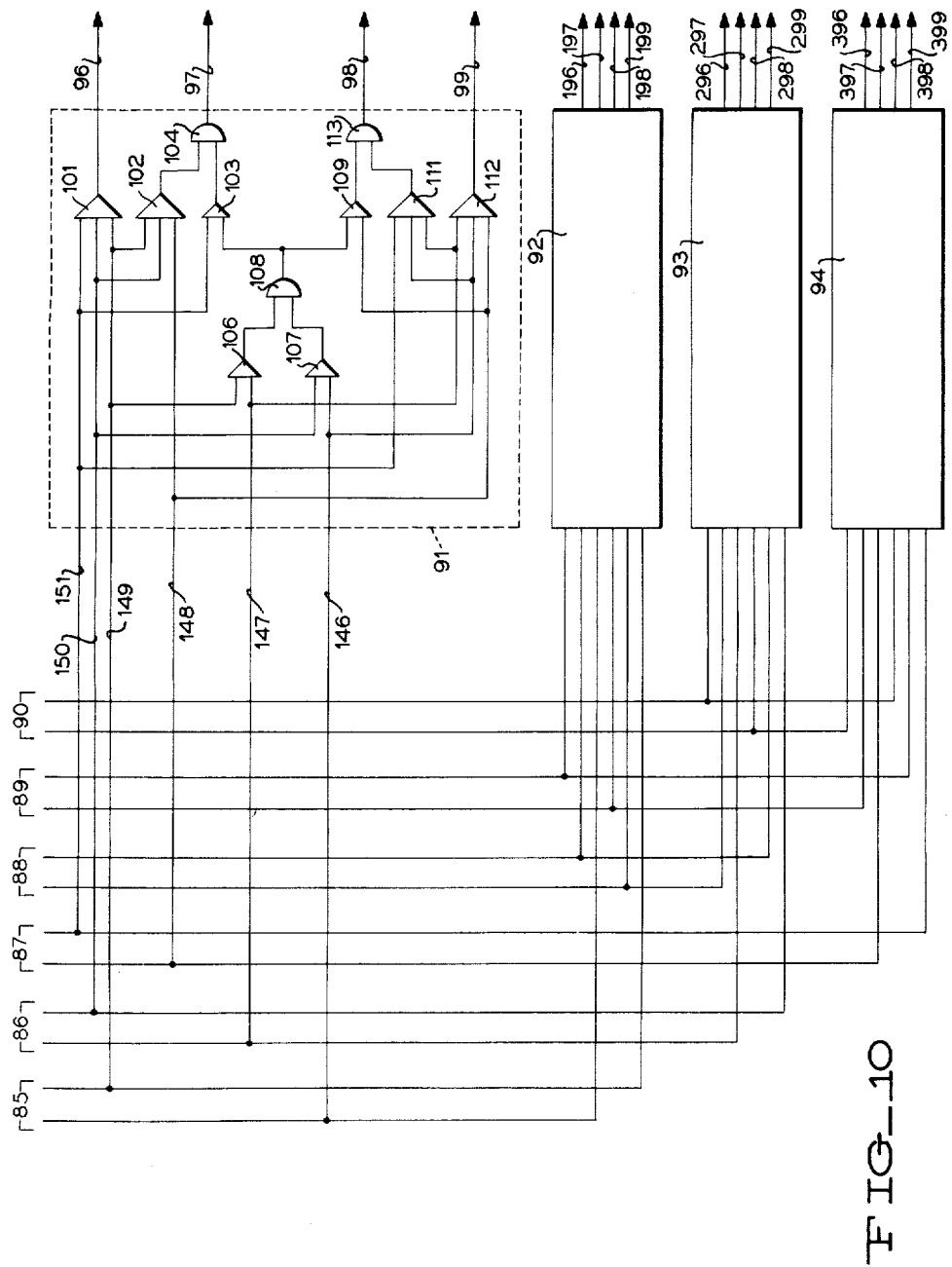

May 8, 1962     F. O. UNDERWOOD     3,034,103
DATA COMPARING AND SORTING APPARATUS
Filed Aug. 6, 1958     7 Sheets-Sheet 7
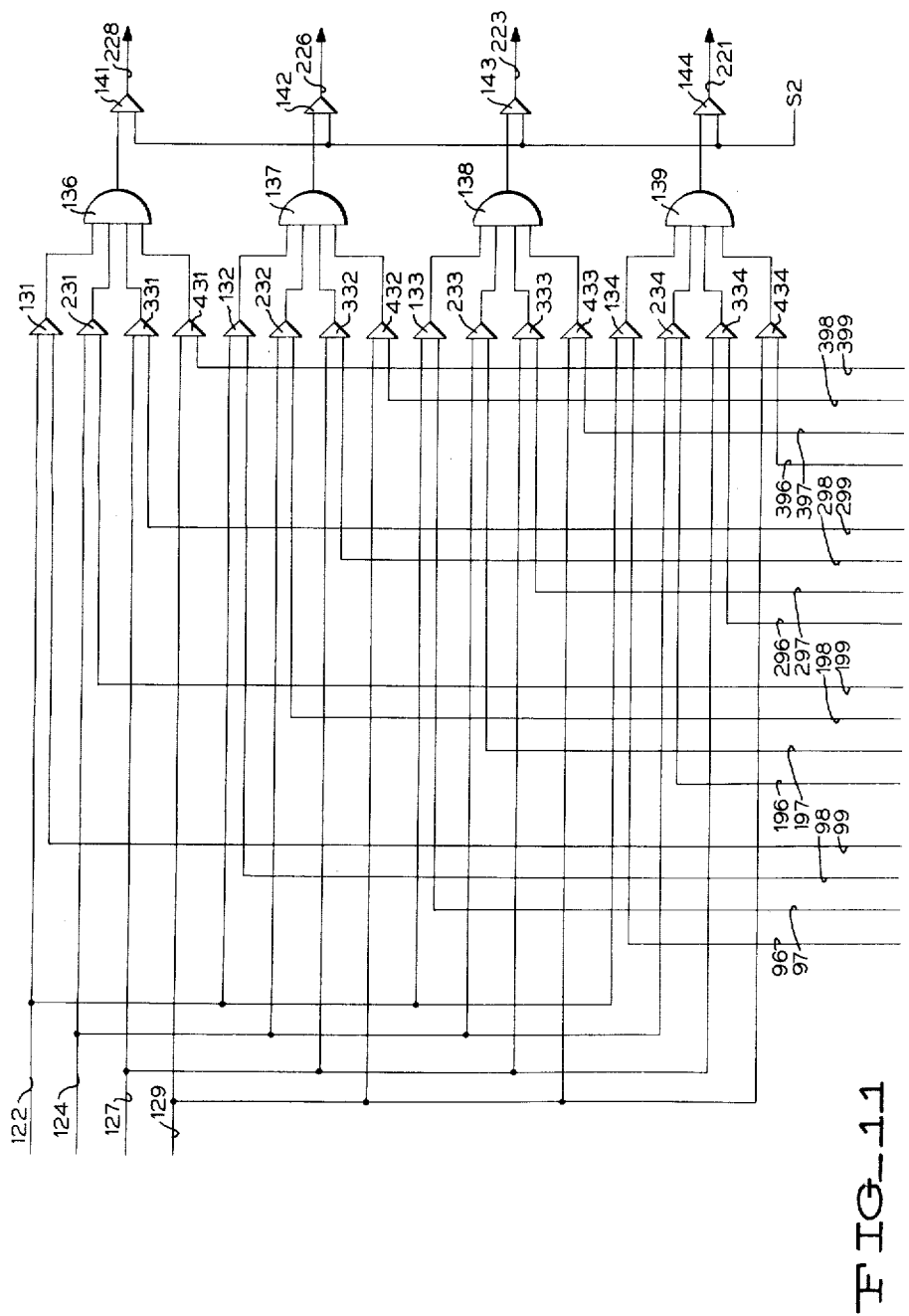
FIG_11

United States Patent Office 3,034,103
Patented May 8, 1962

3,034,103
DATA COMPARING AND SORTING APPARATUS
Francis O. Underwood, Vestal, N.Y., assignor to International Business Machines Corporation, New York, N.Y., a corporation of New York
Filed Aug. 6, 1958, Ser. No. 753,442
5 Claims. (Cl. 340—172.5)

This invention relates in general to apparatus for handling data which is applied thereto simultaneously from a plurality of data sources, and in particular to a data compare-sort apparatus for dispatching data applied thereto simultaneously on a plurality of data input lines to respective ones of a corresponding plurality of high-to-low data output lines in accordance with the relative magnitude of the input data.

The illustrative and preferred embodiment of the present invention is a four-way data compare-sort apparatus having four separate data input lines and an equal number of data output lines. Each one of the output lines is designated as one of the high-to-low relative magnitude indicating lines. That is, the first output line is the one on which data having the highest relative magnitude are applied, the second line is the one along which data of the next lower relative magnitude, i.e., third high data, are applied, the third output line is the one along which second high relative magnitude data are applied, and the fourth output line is the one whereon the data of lowest relative magnitude are applied. The function of the aforesaid data compare-sort apparatus is to initially compare binary coded, serially ordered, high order first, input data which is provided simultaneously on the aforesaid four input data lines, and to then sort these data in accordance with the comparison results by operatively connecting each of the four input lines to a respective one of the four output data lines. The present invention is shown and described herein as embodied in a multi-head, off-line magnetic tape sorter system which is disclosed and claimed in the copending Armstrong et al. U.S. patent application, Serial No. 753,441 which was filed on August 6, 1958. This system is one for efficiently arranging a file of record blocks each of which includes at least one character data, in a predetermined ordered sequence. Briefly described, this sorter system, which does not require programming, is one wherein a plurality of pairs of associated read and write magnetic heads are arranged in operating relationship to a magnetic tape file whereon randomly arranged record blocks are stored, and which heads are spaced in accordance with an arithmetic progression with respect to the record blocks stored on the tape file. Thus, as the magnetic tape file is advanced relative to the aforesaid pairs of tape file information operating heads, a plurality of stored character data are read simultaneously from the tape file into the subject data compare-sort apparatus invention embodiment. The signals representing these plurality of parallel applied character data are dispatched through the said apparatus to the output thereof so that they appear simultaneously thereat on a corresponding plurality of lines which are designated high-to-low according to their relative magnitude standings. That is, these data appear in a predetermined ordered sequence prior to being rerecorded onto the magnetic tape file in this predetermined order sequence by certain ones of select write heads.

Thus, according to the basic concept of the present invention, randomly provided input information is dispatched through a data compare-sort apparatus so that these data appear on the output lines thereof in a predetermined ordered sequence in accordance with the relative magnitude of these input data. Accordingly, another broad object of this invention is to provide apparatus capable of operating in accordance with this concept. Restated, another object of this invention is to provide data compare-sort apparatus for dispatching a plurality of simultaneously provided input data signals to respective ones of a corresponding plurality of data output lines in accordance with the relative magnitude of the input signals.

A broad object of this invention is to provide improved apparatus for handling data provided simultaneously thereto from a plurality of data sources.

A significant feature of the subject data compare-sort apparatus is afforded by means effective to latch-connect i.e., to connect for a predetermined length of time, each of the data input lines to a respective one of the data output lines consequent upon unmatched input data and in accordance with the relative magnitude of these unmatched data. These latch-connect effecting means remain operated to operatively connect the input and the output lines as stated, until a reset signal is applied thereto to disable the same. Thus, it should be clear that record blocks as defined by groups of serially ordered character data may be sorted in accordance with the first unmatched data comparison result. Furthermore, it should be clear that any size record blocks may be handled so long as the afore-mentioned reset signal is applied to the subject apparatus latch-connect effecting means at the end of a record block.

Accordingly, another object of this invention is to provide an $n$-way data compare-sort apparatus for dispatching along one of "$n$" lines a plurality of serially ordered character data in accordance with an initial unmatched data comparison result. In line with the foregoing, another object of this invention is to provide an $n$-way data compare-sort apparatus for dispatching "$n$" number of equal length record blocks in accordance with an initial unmatched data comparison result.

Another object of this invention is to provide apparatus for latch-connecting each of a plurality of data input lines to a respective one of a corresponding plurality of output lines in accordance with an initial unmatched input data comparison result, and for preventing a change of this latch-connect condition regardless of the relative magnitudes of succeeding input data signals until a reset timing signal is selectively applied at the predetermined time to the said apparatus.

Other objects of the invention will be pointed out in the following description and claims and illustrated in the accompanying drawings, which disclose, by way of examples, the principle of the invention and the best mode which has been contemplated of applying that principle.

In the drawings:

FIG. 2 illustrates the arrangement of a tape file with respect to the pairs of character data read-write heads of the illustrative embodiment shown in FIG. 1.

FIG. 3 illustrates the parallel-by-bit character data code as recorded on the tape file.

Figure 1:
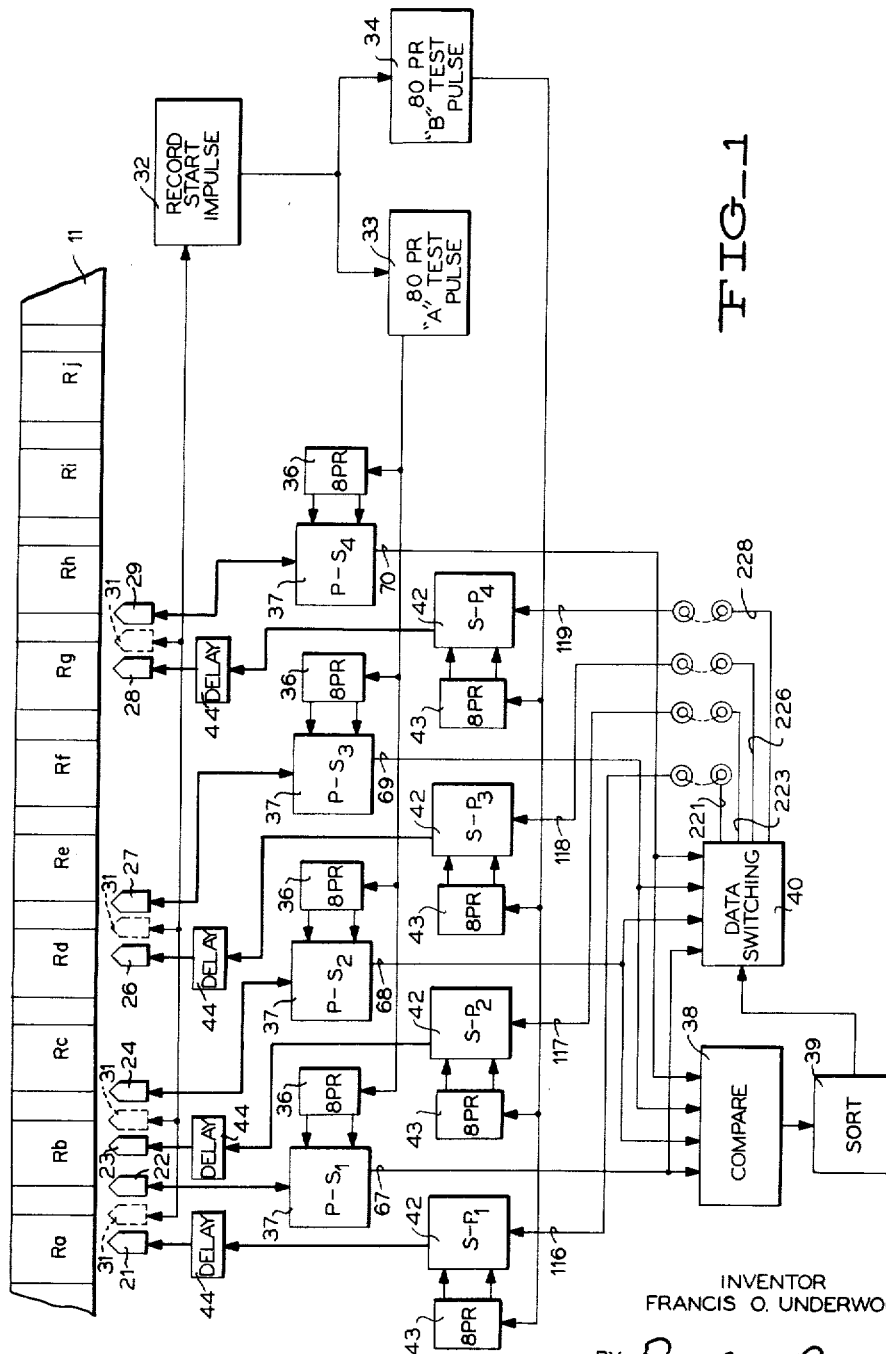
FIG. 1 is a block diagram of a data handling system wherein the illustrative and preferred embodiment of the present invention is used.

FIGS. 4–6, inclusive, depict the manner in which randomly arranged character data are handled by the system of FIG. 1 for sorting.

FIG. 7 is a wiring diagram of a two-way data compare-sort apparatus.

FIG. 8 is a timing chart of signals applicable to the apparatus of FIG. 7.

FIGS. 9–11, inclusive, taken together are a wiring diagram of the four-way data compare-sort apparatus utilized in the embodiment shown in FIG. 1.

Prior to describing the present invention in detail, it is deemed advisable to define certain terms which are to be used throughout this specification as follows:

(1) A "memory" is any device in which information can be introduced and then extracted at a later time. Thus, a few such devices may be specified as magnetic tapes, magnetic drums, electrostatic storage elements, and magnetic core registers.

(2) A "character data" is a set of elementary symbols, binary or otherwise, which may be arranged in ordered aggregates to express information. Thus, as shown in FIG. 3, the various character data handled by the illustrative embodiment of the present invention are binary coded data for expressing numeric, alphabetic and special character symbols.

(3) "Character datum read-write elements" include those devices required to read and to write, respectively, individual sets of elementary symbols expressing information. Thus, a character datum read device as employed in the system of FIG. 1 to read the code illustrated in FIG. 3, would require seven magnetic bit read heads.

(4) A "record block" is defined as a group of character data which are to be considered as a unit, and accordingly, a record block must include at least a single character datum. Furthermore, fixed length record blocks must each include a similar number of character data positions.

*General Description of Sorting System*

As stated previously, the illustrative and preferred embodiment of the present invention is to be described as it relates to a data handling system which includes a magnetic tape file and associated apparatus for rearranging the data originally randomly recorded on the tape file, in a predetermined ascending ordered sequence. Referring to FIG. 1, a magnetic tape file 11 (see also FIG. 2) is employed as a memory for a plurality of equal length record blocks R*a*–R*j*. For purposes of this specification, each of the record blocks includes eighty serially ordered, parallel-by-bit character data in a distance of one inch of the tape file 11. In keeping with the binary coded character data shown in FIG. 3 for numeric, alphabetic and special character symbols, examples include the numeric value "1" represented by a binary 1 bit recorded in the "1" position, whereas the alphabetic character "A" is represented by the parallel 1, A and B binary 1 bits. Similarly, the special character "$" is represented by the 1, 2, 8 and B binary 1 bits, whereas the blank character is represented by an absence of all binary 1 bits in a character data position. It is understood that binary "0's" are recorded in each location where no binary "1" bits are recorded.

The tape file (FIGS. 1 and 2) is advanced past the pairs of associated character data read-write heads 12–15, which pairs thereof are spaced according to the afore-stated arithmetic progression, by conventional sprocket tape drive means 16—17, so that the tape file 11 is advanced at a constant rate of speed from supply reel 18 to take-up reel 19.

Each of the pairs of associated character data read-write heads includes seven respective read and write heads, one for each of the parallel bit designations on tape file 11 (see also FIG. 3). Thus, the pair of associated read-write heads designated by the reference numeral 12 in FIG. 2, includes seven parallel write heads 21 (only one of which is shown for the sake of simplicity) and seven corresponding read heads 22.

Although only four pairs of associated character data read-write heads are shown in the system of FIGS. 1 and 2 for the sake of brevity as well as to avoid undue complexity, it is to be understood that any number of pairs of associated heads which are spaced in an arithmetic progression, may be used, and the four pairs shown in FIGS. 1 and 2 are not to be construed as limitations with regard to the present invention.

Referring to FIG. 1, immediately prior to a time that the first serially ordered, parallel-by-bit character datum of a record block, such as record block R*b* for example, is moved in operating relationship with respect to a character datum reading head, such as the seven parallel heads represented by the reference numeral 22 for example, a record start recorded signal is read by any one or more of the heads 31 arranged in alignment with similarly designated channel shown in FIG. 3, whereupon a record start signal is applied simultaneously from the record start circuit apparatus 32 to a pair of "A" and "B" eighty-point test pulse rings 33 and 34 of conventional design. The first "A" pulse will be applied simultaneously to four eight-point rings 36 just as the first character datum in each of four respective record blocks is moved past a corresponding one of the character datum read heads 22, 24, 27 and 29. Thus, during the time defined by the first point of the eight successively appearing signals from ring 36, parallel-by-bit character data defining signals will be applied from each of the aforesaid character data read heads to a respective parallel-by-bit-to-serial-by-bit (P to S) translating static register 37. During a time defined by the next following seven points of ring 36, the parallel-by-bit character datum stored in each of the registers 37 are read therefrom in serial-by-bit fashion, high order first. These plurality of serial-by-bit character data defining signals are applied simultaneously over separate parallel lines 67–70 from their respective registers 37 to the compare apparatus 38 of a four-way data compare-sort apparatus comprised of apparatuses 38–40 which are to be defined in detail shortly. These simultaneously entered character data defining signals are compared on a bit-by-bit basis in order to determine the relative magnitudes, so that each of the character data being compared appear on the output lines 116–119 of the data switch apparatus 40 in a predetermined ascending ordered sequence. That is, the character datum of the lowest relative magnitude is applied via line 116 from the data switch circuit 40 to the serial-by-bit-to-parallel-by-bit (S to P) translating static register 42 associated with the first character data write heads 21. The next highest, i.e., the second high, character datum defining signals are applied via line 117 to the register 42 associated with the next following character datum write heads 23. Similarly, the third highest character datum defining signals are applied via line 118 to the register 42 associated with the third character datum write heads 26, whereas the signals defining the character datum of highest relative magnitude are applied via line 119 to the register 42 which is associated with the character datum write heads 28. Thus, four simultaneously applied character data which according to their respective relative magnitudes appear in a random fashion along line 67–70, are each caused to appear simultaneously along one of the lines 116–119 in accordance with the relative magnitude standings.

As is shown in FIG. 1, operation of each of the static registers 42 is governed by respective eight-point ring 43 which is similar to ring 36. Each of the rings 43 is started on its eight-point cycle by the application of a "B" test pulse from the apparatus 34. During a time defined by the first seven points of the rings 43, the serial-by-bit defined character data appearing at the output of data switch 40 are applied therefrom via lines 116–119 to their respective registers 42 in timed sequence with the operation of these rings. During the eighth point of operation of a ring 43, the already stored serial-by-bit character datum in a "S to P" register 42, is read out therefrom in parallel-by-bit form to a respective one of the character datum write head delay units 44. The data entered into each of the units 44 is stored therein until the section of the tape file 11 from which the character data to be recorded were originally read, is moved relative to the character data write heads, such as heads 28 for example.

Thus, it may be stated in summation that consequent upon each of the eighty character data positions in any given record block being moved past a particular character datum read head, these data are first translated from a parallel-by-bit form to serial-by-bit form, after which they are applied simultaneously to the compare-sort apparatuses 38–40, whereupon the character data defining signals are rearranged and caused to appear on the output lines 116–119 thereof in a predetermined ascending ordered sequence. These rearranged character data are applied to their respective registers 42 whereat they are translated from serial-by-bit form to parallel-by-bit form prior to being stored for a required length of time in a respective delay unit 44, after which they are rerecorded on tape file 11.

Character Data Compare-Sort Apparatus

As will be brought out shortly, the operation of the data compare-sort apparatus 38–40 is such as to sort all of the character data in any given record block similarly to the sort of the first unmatched character data in the record block. Thus, for example, if the first character datum of record block Ra (FIG. 1) as read by character data head 22 is high with respect to the first character datum in record block Rb, the so-called memory apparatus of the data compare-sort apparatus 38–40 will be operated to latch-connect lines 67 and 68 to lines 117 and 116, respectively, for the time required to move the tape file a distance respected by a record block. Accordingly, the remaining 79 character data in each of these record blocks will be routed similarly and in accordance with the initial relative magnitude determination for the first unmatched character data. At the end of the record block, the aforementioned memory apparatus is disabled in preparation for the next record block sort.

*Two-way data compare-sort apparatus.*—This apparatus is disclosed and claimed in a copending application for M. Marcus, Serial No. 753,443, filed on August 6, 1958.

Referring to FIG. 7, apparatus is shown whereby binary coded signals appearing along so-called primary and secondary data input lines 746 and 747, respectively, are normally dispatched onto their respectively associated high and low character data output lines 748 and 749. That is, the primary input data will normally appear on the high data output line 748 via the AND gate 751, whereas the secondary data will normally appear on the low data output line 749 via the AND gate 753. In the event that a binary coded, serially ordered, high order first, secondary data signal appears on line 747 which is of greater relative magnitude than the corresponding primary data signal on line 746, the secondary input data will be caused to appear on the high output line 748 via AND circuit 752, whereas the primary character data will be caused to appear on the low output line 749 via the AND gate 754. Furthermore, as stated previously the operation of the so-called memory portion 772 of the apparatus shown in FIG. 7, is such as to latch-connect the primary input line 746 to the low data output line 749 and the secondary input line 747 to the high data output line 748. Thus, all of the succeeding character data signals appearing on lines 746 and 747 will be sorted in accordance with the relative magnitude determination for the first unmatched character data in a given record block until the memory apparatus 772 is reset. Similarly, in response to the first unmatched character data condition wherein the primary input data signal is of higher relative magnitude than a secondary input data signal, the apparatus shown in FIG. 7 will be so latch-connected as to cause the primary and secondary input lines 746 and 747, respectively, to be connected to the high and low output data lines 748 and 749, respectively.

*Operation of the two-way data compare-sort apparatus when the primary character data are of higher relative magnitude than a corresponding secondary character data.*—At a predetermined time, such as the end of each record block for example, a timed reset signal is applied to the reset line 758 associated with triggers 759 and 760 in order to turn these triggers off. So long as these triggers 759 and 760 are off, positive signals are applied to their respective AND gates 751, 753 and 761 via their respective output lines 768 and 770. Whenever trigger 760 is turned on as will be described shortly, positive signals are applied only to AND gates 752 and 745 via line 769. Furthermore, the positive signal applied to AND gate 761 during the time trigger 759 is off, is removed therefrom when this trigger is turned on as will also be described shortly.

Let it be assumed that the first unmatched, serially ordered, binary coded, character data signal occurs at time T1 (see also FIG. 8) and is one wherein the primary data input line 746 is at a positive potential while the secondary data input line 747 is at a less positive potential and, in fact, is preferably at a zero or negative potential. At the instant T1 that the primary line 746 is positive and the secondary input line 747 is negative, all of the three inputs to AND gate 762 in comparing apparatus 771 will be at a positive potential. As may be seen in FIG. 7, this is due to the fact that the negative secondary input line signal is inverted by the inverter 763, while the output of AND gate 761 is positive during sample S1 time since both of the triggers 759 and 760 are still off, having been reset prior to time T1. Thus, at time T1 a positive signal will appear at the output of AND gate 762 and will be applied to trigger 759 via line 767, to thereby turn the said trigger on. This, of course, will immediately cause a negative signal to be applied to the center leg input of AND gate 761 so as to remove the positive signal output therefrom to both of the AND gates 762 and 764. Since trigger 759 will remain in an on condition until a reset signal is applied thereto along line 758, a positive signal cannot appear along the output line of the AND gates 762 and 764 until trigger 759 is reset off. Hence, the two-way data compare-sort apparatus shown in FIG. 7 is caused to be latch-connected until trigger 759 is turned off in such a manner that all of the primary input data signals along line 746 will be dispatched via AND gate 751 and OR gate 756 to the high data output line 748, whereas all of the secondary input data signals along input line 747 will be dispatched via AND gate 753 and OR gate 757 to the low data output line 749. As is evident from an examination of FIGS. 7 and 8, these character data signals are gated by the apparatus 773 in timed relation with the application of the sample signal S2 pulses on line 776.

*Operation of the two-way data compare-sort apparatus in response to the high secondary character data input signal.*—When a positive signal is caused to appear along secondary input line 747 while a corresponding negative signal is caused to appear along primary input line 746, all of the input signals to AND gate 764 will be positive only if this represents the first unmatched condition following the reset of triggers 759 and 760. Thus, if it is assumed that a reset pulse is applied to line 758 (FIG. 7) immediately prior to time T3 (see FIG. 8), the aforestated condition will exist. All of the inputs to AND gate 764 will be positive at time T3 because (a) the negative primary input signal is applied as a positive signal by inverter 766 to one leg of the input to AND gate 764, and (b) so long as both triggers 759 and 760 are turned off, the output of AND gate 761 at S1 pulse time is positive. Thus, with all three of the inputs to AND gates 764 positive, a positive potential output therefrom is applied to trigger 760 so as to turn said trigger on. As stated previously, when trigger 760 is turned on, a positive signal is applied to the inputs of AND gates 752 and 754 via line 769, whereas the positive signal previously applied to the inputs of AND gates 751, 753 and 761 via line 770, is removed. It should be clear that since one of the inputs, i.e., the one on line 770, to AND gate 761 is negative, the inputs to AND gate 762 and 764 which are connected to the output of gate 761 will also be negative. This condition will persist until the trigger 760 is caused to be reset off by the timing pulse applied to line 758. As a result of the operation of trigger 760 whereby the same is in an on condition, the apparatus shown in FIG. 7 will be latch-connected so that all primary character data signals appearing on line 746 will be dispatched to the low data output line 749 via AND gate 754 and OR gate 757. Similarly, all of the secondary character data signals appearing on input line 747 will be dispatched to the high data output line 748 via AND gate 752 and OR gate 756. Since the AND gates 752 and 754 are each connected to pass positive signals so long as trigger 760 is maintained on, and since trigger 760 once having been turned on is not reset until a predetermined time, such as the end of a record block for example, all of the primary and the secondary character data signals appearing along their respective input lines 746 and 747 will appear along the low and high data output lines 749 and 748, respectively.

*Operation summary of two-way data compare-sort apparatus.*—In summation, the operation of this apparatus is such that while the primary and secondary character data signals are equal, or matched, the primary and the secondary character data signals will be dispatched to the high and the low data output lines, respectively, so long, however, as there has not been an unmatched data condition detected subsequent to the last reset operation of triggers 759 and 760. In response to the first unmatched character data condition following the reset of these triggers, wherein the primary character data signal is high with respect to a corresponding secondary character data signal, the apparatus shown in FIG. 7 is caused to be latch-connected so that for a predetermined period determined by the frequency of the afore-mentioned trigger reset signals, all of the successively applied primary and the secondary character data signals will be caused to appear on the high and the low output lines, respectively. If this predetermined time period is defined by the length of a record block, it should be clear that the record blocks may be of any length, i.e., one or more character data each, so long as they are of equal length. Thus, for example, a record block may include only a single character data, or, as stated previously in connection with the tape file 11 shown in FIG. 1, the record block would include eightly serially ordered character data. In response to the initial unmatched data condition wherein the relative magnitude of a secondary character data signal is higher than the corresponding primary character data signal, the aforesaid apparatus is caused to be latch-connected so that the primary and the secondary character data signals are dispatched to the low and the high output lines, respectively, until the next reset of triggers 759 and 760.

*General description of four-way data compare-sort apparatus.*—Referring to FIG. 9, the character data input lines 122, 124, 127 and 129 may be considered to be operatively connected via the "P to S" registers 37 (FIG. 1) with the character datum reading heads 22, 24, 27 and 29, respectively. These simultaneously provided character data signals are applied to six two-way data compare-sort apparatuses each of which is similar to the apparatus shown in FIG. 7 and each of which is associated with the outputs designated by the reference numerals 85–90 (FIG. 9). The elements of FIG. 9 which correspond to elements of FIG. 7, are identified by similar reference numerals except for the use of reference characters in the 100 series instead of the 700 series. Thus, the line 170 of output 85 (FIG. 9) which corresponds to the line 770 of FIG. 7, is normally positive. This, of course, applies to the left-hand lines associated with the outputs 85–90. In response to either of the input lines 146 or 147 alone having a positive pulse applied thereto to represent the initial unmatched data condition following the application of a reset signal on line 158, the associated AND gates 162 or 164, respectively, will have a positive pulse appear at the output thereof to turn either trigger 159 or 160 on. If trigger 159 is turned on in a manner similar to setting trigger 759 (FIG. 7) on, this will so condition the AND gate 164 (FIG. 9) as to prevent the trigger 160 from being turned on till after trigger 159 has been reset off. Accordingly, until the aforesaid trigger 159 has been turned off, the left-hand line 170 of the first two-way data compare-sort apparatus associated with the output 85, will continue to have a positive signal applied thereto. On the other hand, should the trigger 160 be turned on as a result of a positive signal appearing on the output side of AND gate 164, the AND gate 162 will be disabled since the line 170 associated with trigger 160 will go negative, and accordingly trigger 159 will be inhibited from being turned on. Furthermore, the line 169 of the output 85 will have a positive signal applied thereto until the same is reset off.

The six two-way data compare-sort apparatuses shown in FIG. 9 provide a means for comparing the character data signals on each of the input lines 122, 124, 127 and 129 with each of the character data signals on every one of the other input lines. Thus, the apparatuses associated with the outputs 85–90 afford a means for comparing the character signals on the lines identified as 122 and 124, 122 and 127, 122 and 129, 124 and 127, 124 and 129 and 127 and 129, respectively. To restate the foregoing in another way, each of the aforesaid outputs affords an indication of the relative magnitude of data on any one input line with respect to the data on any other one input line. The individual and separate line-by-line character data signal comparison results afforded by the apparatuses shown in FIG. 9, are applied to the so-called function switches 91–94 (FIG. 10). Each of these switches is a symmetric network having three pairs of inputs which are connected to three certain ones of the output pairs 85–90 (see also FIG. 9), and four output lines, e.g., the output lines 196–199. In response to the excitation of different combinations of the inputs to a symmetric network, a correspondingly different output thereof is excited, i.e., has a suitable signal applied thereto.

In order for a function switch to be symmetric, it must be possible to specify the output conditions without specific reference to the individual inputs thereto. Instead, reference must be made to the number of function switch inputs which are simultaneously excited. For example, a so-called "two-out-of-five" symmetric network function switch provides an output when, and only when, any two of the five inputs thereto are excited simultaneously. Thus, it may be stated in general, that an "*m*-out-of-*n*" symmetric network function switch has "*n*" inputs and only one output, the said output being excited when and only when any "*m*" inputs are simultaneously excited. On the other hand, a so-called full symmetric network function switch having "*n*" inputs, has "*n*+1" outputs. A signal on one of these output lines is indicative of the "zero-out-of-*n*" function, on another is indicative of the "one out of *n*" function, on still another is indicative of the "two out of *n*" function, etc., and a signal on the last output line is indicative of the "*n* out of *n*" function. Accordingly it should be clear that the symmetric network function switches 91–94 (FIG. 10) are of the latter-mentioned type since each has three inputs thereto and four outputs therefrom.

*General description of symmetric network function switches.*—Referring to FIG. 10, the symmetric network function switch 91 is associated with those two-way data compare-sort apparatuses of FIG. 9 which compare the character data signals on input line 122 with the character data signals on the other input lines 124, 127 and 129. Thus, in response to the particular combination of the three symmetric network function switch inputs caused to be excited at any given time, a certain corresponding one of the outputs thereof 96–99 will be excited to indicate the relative magnitude position of the character data signals on line 122 with respect to the signals on the other input lines. In a similar fashion, the symmetric network 92 (FIG. 10) functions to indicate the relative position of the character data signals on input line 124 (see also FIG. 9) with respect to the character data signals on the remaining input lines 122, 127 and 129. Accordingly, the three sets of inputs to the symmetric network function switch 92 are associated with the three two-way data compare-sort apparatuses of FIG. 9 which compare the character data signals on input line 124 with those signals on each of the remaining three input lines; namely, the apparatuses that provide signals to the output pairs 85, 88 and 89. In keeping with the foregoing, the symmetric network function switches 93 and 94 each provide the relative magnitude positions of the character data signals on input lines 127 and 129, respectively, with regard to the character rata signals on the remaining input lines.

Only the symmetric network function switch 91 (FIG. 10) is shown in detail inasmuch as the other function switches 92–94 are similar thereto in every respect. Accordingly, only the circuit arrangement and operation of the symmetric function switch 91 will be described in detail.

*Operation of function switch 91 when the character data on input line 122 are equal or high.*—As a result of the character data signal on line 122 (FIG. 9) being equal or high, the left-hand lines, such as line 170 for example, associated with the outputs 85–87 will be latch-connected to maintain the application of positive signals thereto. Hence, the function switch input lines 146–148 (FIG. 10) will be excited and the function switch output line 99 will have a positive signal applied thereto since the three inputs to AND gate 112 are each connected to the aforementioned lines. Accordingly, when the output line 99 is excited by the application of a positive signal thereto, this is an indication that the character data signals on input line 122 are equal or high with respect to the character data signals on the other input lines 124, 127 and 129. It should be observed, however, that there is no indication as to the relative magnitude standings of the data on lines 124, 127 and 129. This is provided only by output signals from the function switches 92–94. Furthermore it should be pointed out that an indication other than equal provided by function switch 91 will remain until a reset signal is applied to line 158 (FIG. 9).

*Operation of function switch 91 when the character data on input line 122 are second high.*—For a character data signal on input line 122 to be second high, this signal must be lower than either a corresponding signal on input line 124, or a data signal on input line 127, or a data signal on input line 129. Whichever of these latter-mentioned conditions exists, the function switch output line 98 will be excited by the application thereto of a positive signal. Thus, if only the data on input line 129 are higher than that data on input line 122, i.e., the data on input line 122 is of a higher relative magnitude than either of the data on the input lines 124 and 127, the AND gate 111 (FIG. 10) will cause a positive signal to be applied to output line 98 via the OR gate 113. This, of course, is due to only the lines 146, 147 and 151 being excited. On the other hand, if the character data on only input line 127 (FIG. 9) are high with respect to the data on input line 122, a positive signal will be applied to the output line 98 (FIG. 10) by way of the units 107, 108, 109 and 113. This is due to only the lines 146, 150 and 151 being excited. Finally, if the character data signals on only input lines 124 are high with respect to those on input line 122, the output line 98 will once again be excited by way of the units 106, 108, 109 and 113 since only lines 147–149 are excited.

*Operation of function switch 91 when the character data on input line 122 are third high.*—Should the character data defining signals on input line 122 (FIG. 9) be third high, these signals would be of higher relative magnitude than those on only one of the three remaining input lines 124, 127 and 129, and of lower relative magnitude than the signals on two of the said input lines. As a result, the function switch output line 97 (FIG. 10) will be excited by the application thereto of a positive signal. Thus, should the character data signals on input line 122 be of a higher relative magnitude than only those signals applied to input line 129, the function switch output line 97 will be energized via units 102 and 104 since only lines 148–150 are excited. On the other hand, should the character data defining signals on input line 122 be high only with respect to those signals on input line 127, the output line 97 will again be excited by way of the units 106, 108, 103 and 104 since only lines 146, 147 and 148 are excited. Finally, should the character data on input line 122 be higher than only the data on input line 124, the function switch output line 97 will have a positive signal applied thereto via the gates 107, 108, 103 and 104 since only lines 146, 150 and 151 are excited.

*Operation of function switch 91 when the character data on input line 122 are low.*—As a result of the character data defining signals on input line 122 being low with respect to the character data signals on all of the three remaining input lines, the function switch output line 96 alone will be energized via gate 101 by the application of a positive signal thereto. This is due to the fact that only the lines 149–151 are excited.

*Summary of function switch operation.*—In summation, if the character data defining signals on input line 122 (FIG. 9) are high with respect to corresponding signals on each of the remaining input lines 124, 127 and 129, the function switch output line 99 (see also FIG. 10) will be excited. If the character data on input line 122 are high with respect to data on any two remaining input lines but are low in comparison with the character data appearing on a third remaining input line, the function switch output line 98 will be energized. And if the character data on input line 122 are high only with respect to one other character data input line, and are low with respect to the character data defining signals on the remaining two character data input lines, the function switch output line 97 will be energized. Finally, if the character data defining signals on input line 122 are low with respect to those signals on all of the remaining three input lines, the function switch output line 96 will be energized.

In a similar fashion, if the character data on input line 124 are high with respect to all of the other input line character data defining signals, the function switch output line 199 will have a positive signal applied thereto. If the character data defining signals on input line 127 are high with respect to the signals on the remaining three input lines, the function switch output line 299 will have a positive signal applied thereto, whereas a positive signal on the function switch output line 399 will indicate that the character data on input line 129 are high with respect to the character data defining signals on each of the three remaining input lines.

Thus, for example, should the low to high relative magnitude standing of the character data be defined by the data on lines 129, 124, 122 and 127, only the function switch output lines 396 (FIG. 10), 197, 98 and 299 would be excited.

*Four-way data switch apparatus.*—Referring to FIG. 11, the character data defining signals appearing on the input lines 122 (see also FIG. 9), 124, 127 and 129 are gated by the circuit means shown in FIG. 11 to one of the low-to-high output lines 221, 223, 226 and 228. Each of these output lines associated via respective registers 42 (see also FIG. 1) and delay units 44 with a respective one of the character data write heads 21, 23, 26 and 28. Thus, for sorting purposes the character data defining signals appearing on output line 221 (FIG. 11) are considered low with respect to the character data defining signals on the remaining three output lines 223, 226 and 228, and therefore these signals are caused to be re-recorded by the character datum write heads 21 (FIG. 1). Furthermore, the second high, third high and highest relative magnitude character data signals that appear on lines 223, 226 and 228, respectively, are caused to be rerecorded on the tape file 11 (FIG. 1) by their respective character datum write heads 23, 26 and 28. As is shown in FIG. 11, the character data defining signals appearing on input line 122 are caused to appear on (*a*) output line 228 via units 131, 136 and 141; (*b*) output line 226 via the units 132, 137 and 142; (*c*) output line 223 via units 133, 138 and 143; and (*d*) on output line 221 when the units 134, 139 and 144 are conditioned for operation. In a similar fashion, the character data signals appearing on any of the other input lines 122, 124, 127 and 129 may be caused to appear on any one of the output lines 221, 223, 226 and 228.

*Operation of the four-way data compare-sort apparatus.*—Let it be assumed for descriptive purpose that the character data defining signals appearing on input line 127 (FIG. 9) are high with respect to the character data appearing on input line 122 which, in turn, are next high with respect to the character data defining signals appearing on input line 129 which, in turn, are next high with respect to the character data signals appearing on input line 124. It should be clear that the operation of the four-way data compare-sort apparatus shown in FIGS. 9–11 must be such as to cause the input lines 127, 122, 129 and 124 to be operatively connected to the high-to-low data output lines 228, 226, 223 and 221, respectively.

The comparison of the second high character data signals appearing on input line 122 (see FIG. 9) with each of the character data defining signals on each of the other three remaining data input lines, will cause the left-hand lines of the outputs 85 and 87 to be energized, and the right-hand line of output 86 to be energized. Accordingly, the symmetric network function switch 91 (FIG. 10) will cause a positive signal to appear on only output line 98 via the gates 107, 108, 109 and 113. In a similar fashion, the function switch output lines 196, 299 and 397 will also be energized. As may be seen in FIG. 11, the energization of output line 98 will allow the transmission of the character data defining signals on input line 122 to the second high output line 226 via units 132, 137 and 142. The energization of the function switch output line 196 will permit the transmission of the character data defining signals appearing on input line 124 to the low output line 221 via the units 234, 139 and 144. The input line 127 will be operatively connected to the output line 228 as a result of the positive signal on function switch output line 299 which is connected to the input side of AND gate 331, and the positive signal on function switch output line 397 will permit the character data defining signals on input line 129 to be gated via elements 433, 138 and 143 to the third high data output line 223. Since the various triggers, such as triggers 159 (FIG. 9) and 160 for example, used in the four-way data compare-sort apparatus of the system shown in FIG. 1, are reset off only at the end of a record block, the character data signal input lines 122 (see also FIG. 9), 124, 127 and 129 will remain operatively connected to those respective output lines 221, 223, 226 and 228 as determined by the initial unmatched character data condition following a trigger reset operation.

*Operation of System*

As stated previously, if a sufficient number of character data read-write devices are used to handle the character data to be sorted, the sort operation may be accomplished within a single pass of the tape file. The number of devices required to accomplish a sort within one tape file pass, is approximated by the inequality $$H \geq \frac{1+\sqrt{8R-7}}{2}$$

wherein "H" is the least integer greater than or equal to the right-hand expression and indicates the number of heads required, and "R" is indicative of the number of records on the tape file to be sorted. Thus, for example, if a seven "R" record tape file as illustrated in FIG. 5 were to be sorted within a single tape file pass, four character data read-write devices spaced in the arithmetic progression positions A, B, D and G would be required.

*Sort Operation No. 1.*—Referring to FIG. 5, a seven record block tape file identified as "7413265" is caused to be moved at a continuous rate of speed past the four A, B, D and G character data read-write device arrangement shown. To simplify this example, each of the record blocks included within the tape file shown includes a single numeric character data. Hence, a reset timing signal must be applied to the data compare-sort memory apparatus at the end of each character data. It should be clear that the randomly arranged tape file record blocks "7413265" shown in position 1 (Pos. 1) are to be rearranged to the predetermined ascending ordered sequence "1234567" shown in Pos. 19 during a single right-to-left tape file pass. Thus, during Pos. 2 time, the character data "7" and "3" within the first and fourth record blocks, respectively, are compared and sorted as shown by the rearrangement of these character data in Pos. 3. Similarly, the character data "4" and "2" within the second and fifth record blocks, respectively, are rearranged from their positions in Pos. 4 to that shown in Pos. 5. When the tape file is moved to Pos. 6, the character data "3," "1" and "6" within the first, third and sixth record blocks, respectively, are compared and rearranged simultaneously to that shown in Pos. 7 by the character data read-write devices B, D and G. A similar three-way simultaneous comparison is shown in Pos. 8, and the resulting record block rearrangement "1235467" is shown in Pos. 9. The arrangement of the record blocks in Pos. 9 remains the same due to the properly ordered character data read until Pos. 14 times when the fourth and fifth record blocks bearing character data "5" and "4," respectively, are aligned with the first and second character data read-write devices A and B. Accordingly, the character data within these record blocks are rearranged to the form shown in Pos. 15, wherein all of the record blocks are in the predetermined ascending sequence "1234567."

*Sort operation No. 2.*—Another example of the operation of the subject character data sorting system in which an eleven record block tape file is sorted during a single pass, is shown in FIG. 6. This tape file is moved relative to seven character data read-write devices arranged in accordance with an arithmetic progression at positions A, B, D, G and K. Referring to FIG. 6, the handling of the character data may be explained briefly as follows:

Pos. 1—the character data "4" and "2" of the first and fifth record blocks, respectively, are compared and sorted simultaneously to that shown in Pos. 2 by circuit apparatus including the read-write devices G and K.

Pos. 2—the character data "7" and "7" within the second and sixth record blocks are not rearranged since they are determined to be of equal magnitude by the apparatus including character data read-write devices G and K.

Pos. 3—the third and seventh record block character data "1" and "2," respectively, are in the correct predetermined ordered sequence, so that these data are not rearranged by their operating devices G and K.

Pos. 46—the character data "2," "5" and "3" within the first, fourth and eighth record blocks, respectively, are compared and sorted simultaneously to the desired ascending sequence by the apparatus including devices D, G and K.

Pos. 5—the second, fifth and ninth record block character data "7," "4" and "6," respectively, are handled simultaneously by apparatus including read-write devices D, G and K, so that the fifth record block character data are inserted in the second record block (see Pos. 6), whereas the second record block character data are inserted in the ninth record block. The ninth record block character data, of course, are inserted in the fifth record block position.

Pos. 6—at this time, the first, third, sixth and tenth record block character data "2," "1," "7" and "9", respectively, are handled and sorted simultaneously. Since these character data are already in the predetermined ascending ordered sequence, these data are not rearranged.

Pos. 7 at this time, a five-way data compare-sort operation takes place by the simultaneous handling of the character data "1," "4," "3," "2" and "8" in the first, second, fourth, seventh, and eleventh record blocks, respectively. These data are rearranged to the order shown in Pos. 8.

Pos. 8–17—the various record block character data are handled as indicated hereinabove, while the tape file is further moved past the various character data read-write devices A, B, D, G and K. Thus, the tenth and eleventh record blocks are in operating relationship to the read-write devices A and B when the tape file is in Pos. 16. As a result, the character data "9" and "8" within these two later-mentioned record blocks will be rearranged to the predetermined ascending ordered sequence shown in Pos. 17.

*Sort operation No. 3.*—As indicated previously, in order to accommodate those tape files which include an extremely large number of record blocks, e.g., upwards of five thousand record blocks, an extremely large number of character data read-write devices would be required and would have to be spaced in an arithmetic progression along the length of the tape file so as to accomplish a complete record block data sort operation during a single tape file pass. This does not at the present state of the art appear to be a feasible arrangement since any number of character data read-write devices in excess of sixteen to twenty, for example, is undesirable. As brought out previously, if a number of heads fewer than that required by the afore-stated inequality $$H \geq \frac{1+\sqrt{8R-7}}{2}$$

for effecting a single tape file pass sort, are used, several passes of the tape file will be required. The number of passes that will be necessary to effect a complete sort operation is approximated by the equation $$P = \frac{1+\sqrt{8R-7}}{H-1}$$

wherein "P" indicates the number of tape file passes, "R" is an integer representing the number of tape file record blocks, and "H" indicates the number of character data read-write devices actually employed. Thus, for example, if it were desirable to sort a tape file of eleven record blocks (see FIG. 4) with three character data read-write devices, two tape file passes would be required. Referring to FIG. 4, it may be seen that whenever it is necessary to perform a second tape file pass relative to the character data read-write devices employed, it is necessary that these devices be rearranged after the first pass so that when they are considered collectively, their spacing is in accordance with the aforesaid arithmetic progression. Accordingly, during the first pass of the tape file in FIG. 4, it will be necessary that the last two, i.e., the furthest spaced, character data read-write devices be spaced apart in accordance with the expression $$S \geq \frac{\sqrt{8R-7}-1}{2}$$

wherein "R" represents the total number of record blocks and "S" is a whole number. Thus, if a tape file includes eleven record blocks and only three character data read-write devices as shown in FIG. 4, two tape file passes will be required as stated previously to rearrange the record blocks in a predetermined ascending ordered sequence. Furthermore, it is necessary that during the first pass, the adjacent character data read-write devices D and H be spaced apart a distance defined by four record blocks. The next set of adjacent heads A and D must be set apart during this pass a distance one record block less, or three record blocks. Accordingly, as the originally recorded tape file with the randomly arranged record blocks "47152723698" thereon is moved past the character data read-write devices A, D and H, these record blocks will appear in the order "24125736798" at the end of the first tape file pass. The action that takes place is similar to that already described, and for that reason need not be repeated here.

Prior to the next tape file pass, it is necessary that the three character data read-write devices be rearranged in accordance with the arithmetic progression as initially defined during the first tape file pass. Thus, the first tape file pass adjacent devices A and D which were separated by three record block lengths, may remain in the same positions during the second tape file pass. It is necessary, however, that a character data read-write device be placed at position B. Thus, the first and second devices A and B will be spaced apart only one record block length and the second and third devices B and C will be spaced apart two record block lengths. Thus, as the tape file shown in FIG. 4 with the record blocks "24125736798" recorded thereon in accordance with their respective positions at the end of the first tape file pass, is moved past the character data read-write devices A, B and D during the second tape file pass, these record blocks "24125736798" are rearranged to the predetermined ascending ordered sequence "12234567789" in the manner previously described. Thus, the original eleven record block tape file will have been sorted through the use of three character data read-write devices within two tape file passes, with appropriate spacings of the read-write devices for each pass.

*Summary*

It should be clear by this time that the subject data compare-sort apparatus is one for handling a plurality of input data applied thereto simultaneously. It must be made clear that the four-way data compare-sort apparatus described hereinbefore is merely an illustrative embodiment of the present invention since the principles of the same can be applied to an apparatus for handling data applied thereto simultaneously from any plural number of data sources. Thus, if a $n$-way data compare-sort apparatus is considered, wherein the term "$n$" represents any plural number of input data lines to the said apparatus, there must be $$\frac{n^2-n}{2}$$

two-way data compare-sort apparatuses. Each of these latter-mentioned apparatuses will have at the output thereof a pair of output lines. Accordingly, there will be $$\frac{n^3-n}{2}$$

pairs of output lines from all of the two-way data compare-sort apparatuses. Since there must be a symmetric network function switch for each input line, there must, of course, be $n$ such switches. Each of these switches has $n-1$ pairs of input lines thereto which are connected to respective ones of the pairs of output lines from the afore-mentioned two-way data compare-sort apparatuses operatively connected to a given function switch, are those which are also operatively connected to the input line to which the aforesaid function switch is related. Furthermore, each of the function switches has $n$ output lines, any one of which may be excited alone at any given time to indicate the relative magnitude standing of a data on a particular input line with respect to all of the other data on the remaining input lines. The outputs from each of the $n$ function switches, are applied to a data switching apparatus for operatively connecting the $n$ input lines to respective ones of $n$ output lines.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intension, therefore, to be limited only as indicated by the scope of the following claims.

What is claimed is:

1. In a data comparing apparatus for comparing and sorting data appearing simultaneously on a plurality of data input lines in accordance with the relative magnitude of the data, in combination, a plurality "$n$" of input data lines, a corresponding plurality "$n$" of output data lines, data switching means for selectively connecting each of said input data lines to each of said output lines under the control of "$n^2$" switching signals supplied to said data switching means, a plurality of two-way data comparing devices, equal in number to $$\frac{n^2-n}{2}$$

each of said two-way data comparing devices having a pair of compare inputs and a pair of compare outputs, said compare inputs being connected to said input data lines in each possible combination of pairs of input data lines, each of said pairs of compare outputs having a signal appearing on one of said compare outputs to indicate a high or equal value input on one of the data input lines with respect to the other, and having a signal appearing on the other of said compare outputs to indicate a low value input on said one of the data input lines with respect to the other, a plurality "$n$" of symmetric switching networks, each having "$n-1$" pairs of switching inputs, one for each of said pairs of compare outputs and having "$n$" switching outputs, said data switching means being governed by the "$n^2$" switching outputs of said symmetric switching networks.

2. In apparatus for determining the relative magnitude of data from one of "$n$" data sources with respect to data from the remaining "$n-1$" data sources, the combination comprising, a plurality "$n$" of data input lines connected to said data sources, a plurality "$n$" of data output lines, data switching means for selectively connecting each of said data input lines to a selected one of said data output lines in all of the "$n^2$" possible combinations under the control of "$n^2$" switching control signals, a plurality $$\frac{n^2-n}{2}$$

of two-way comparing devices, each of said devices having a pair of compare inputs, and a pair of compare outputs, and having means normally effective to energize a respective one of said compare outputs and effective to energize the other of said compare outputs in response to the signals supplied to said device on one of said compare inputs being of lesser magnitude than the signal on the other of said compare inputs, said two-way comparing devices having their compare inputs connected to said data input lines in each possible combination of pairs of data input lines, whereby the data on each data input line is compared with the data on all other input lines and the relative magnitude is indicated by signals on said compare outputs, a plurality "$n$" of symmetric switching networks, each having "$n-1$" pairs of switching inputs and "$n$" switching outputs, said outputs being indicative of the number of switching inputs which are simultaneously effective, said switching inputs being connected to said compare outputs, and said switching outputs being connected to said data switching means for supplying thereto switching control signals to govern the connection of said data input lines to said data output lines.

3. In apparatus for determining the relative magnitude of data from one of "$n$" data sources with respect to data from the remaining "$n-1$" data sources, the combination comprising, a plurality "$n$" of data input lines connected to said data sources, a plurality "$n$" of data output lines, data switching means for selectively connecting each of said data input lines to a selected one of said data output lines in all of the "$n^2$" possible combinations under the control of "$n^2$" switching control signals, a plurality $$\frac{n^2-n}{2}$$

of two-way comparing devices, each of said devices having a pair of compare inputs and a pair of compare outputs and having means normally effective to energize a respective one of said compare outputs and effective to energize the other of said compare outputs in response to the signals supplied to said device on one of said compare inputs being of lesser magnitude than the signal on the other of said compare inputs, and further effective to maintain the other of said compare outputs energized for the remainder of the comparing operation; said comparing devices having their compare inputs connected to said data input lines in each of the possible combinations of pairs of data input lines, whereby the data on each data input line is compared with the data on all other input lines and the relative magnitude is indicated by signals on said compare outputs, a plurality "$n$" of symmetric switching networks, each having "$n-1$" pairs of switching inputs and "$n$" switching outputs, the "$n^2-n$" switching inputs of said symmetric networks being connected to respective pairs of said compare outputs and the "$n^2$" switching outputs of said symmetric networks being connected to said data switching means to govern the connection of said input data lines to said output data lines.

4. Apparatus as claimed in claim 3 in which each of said two-way comparing devices includes a bistable device arranged to be initially set to a first condition, and to be set to a second condition when the signals on one of said compare inputs is of lesser magnitude than the signal on the other of said compare inputs, and switching means governed by said bistable device for energizing said compare outputs.

5. Apparatus as claimed in claim 3 in which each of said two-way comparing devices includes a first and a second bistable device, both of which are initially set to a first condition, circuit means for governing said first and said second bistable devices in accordance with signals supplied thereto on said compare inputs to set the associated bistable devices in a second condition, interlocking circuit means connecting said first and said second bistable devices so that either bistable device when set in its second condition maintains the other bistable device in its first condition, and circuit means connecting said compare outputs to said bistable devices for energization therefrom.

References Cited in the file of this patent
UNITED STATES PATENTS 2,844,309     Ayres                  July 22, 1958